R. B. BENTLEY.
FISH TRAY.
APPLICATION FILED APR. 4, 1918.

1,301,031.

Patented Apr. 15, 1919.

Inventor:
Raymond B. Bentley,
by Hazard & Miller
Att'ys.

UNITED STATES PATENT OFFICE.

RAYMOND B. BENTLEY, OF EAST SAN PEDRO, CALIFORNIA.

FISH-TRAY.

1,301,031. Specification of Letters Patent. Patented Apr. 15, 1919.

Application filed April 4, 1918. Serial No. 226,789.

*To all whom it may concern:*

Be it known that I, RAYMOND B. BENTLEY, a citizen of the United States, residing at East San Pedro, in the county of Los Angeles and State of California, have invented new and useful Improvements in Fish-Trays, of which the following is a specification.

My invention relates to fish trays and especially to trays for preparing fish for market, and the invention consists in the novel features herein shown, described and claimed.

In the canning or packing of sardines, the fish are first subjected to a process of removing the scales, then the head and entrails are removed and the fish are then soaked in strong brine. The next step is to thoroughly dry or desiccate the fish and the final step is to treat the dried fish with oil such as cotton seed oil, fish oil or the like, and pack the same in trade containers, such as tin cans.

The above process is the one now generally used. In the old method, the fish, after removal from the brine, are placed in wire screen containers in bulk and subjected to the drying process. By reason of the fact that the fish are placed in bulk in the wire screen containers, the drying proceeds unevenly, and some of the fish in the interior of the mass are not dried in the same degree as those in the exterior layers. When the fish are segregated from the dried mass, they adhere together and a percentage of them become broken. These broken fish are rejected as refuse. The dried fish, it should be remembered are quite brittle, and this waste of broken fish cannot be avoided, even with careful handling.

It is an object of this invention to provide a tray for evenly and quickly handling the fish and avoiding the liability of breakage.

Figure 1:
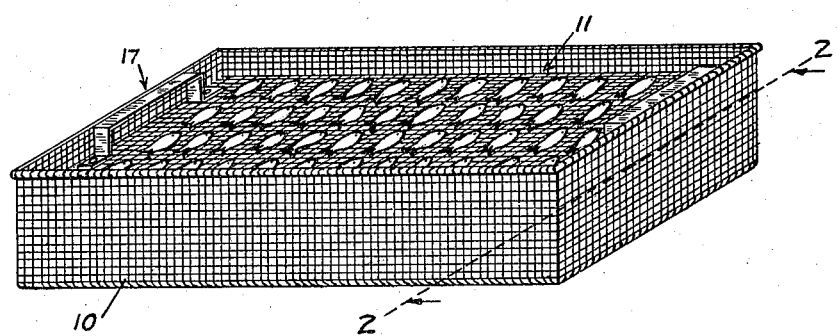
Figure 1 is a perspective of a fish tray embodying the principles of my invention.
Figure 2:
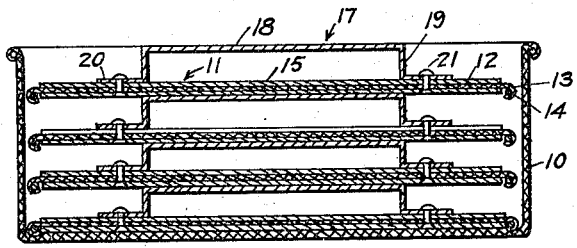
Fig. 2 is a cross section taken on line 2—2 of Fig. 1.
Figure 3:
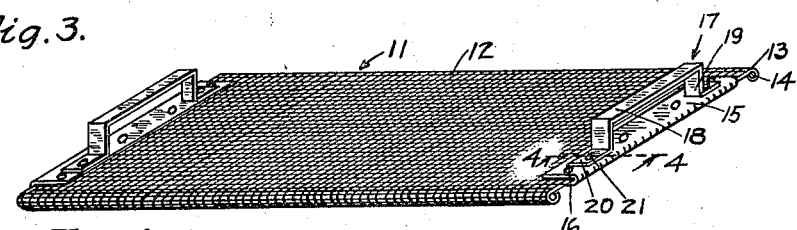
Fig. 3 is a perspective view of one of the tray members.
Figure 4:
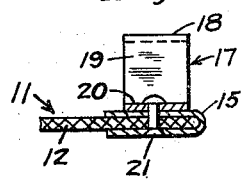
Fig. 4 is a detailed view on line 4—4 of Fig. 3.

Referring to the drawings, 10 indicates a wire basket rectangular in cross-section in which a series of trays 11 are horizontally disposed in spaced relation to each other. Each tray 11 consists of a wire screen plate 12 having rolled edges 13 in which a supporting reinforcing rod 14 is disposed. The short sides of the trays are provided with metal plates 15 bent upon themselves in a U-shaped manner as clearly shown in Fig. 5, in which the ends of the wire screen 12 are secured by means of rievts 16. Each end plate 15 is provided with a handle 17 formed of a strip of metal comprising a flat portion 18 spaced from and parallel to the end plate 15, vertical side members 19 and end portions 20 lying flat on the plate 15 to which they are secured by means of rivets 21. The fish to be treated are placed on the trays in a single layer and spaced from each other, or "flaked" as it is called, there being four rows of sardines shown in Fig. 1. The flat portions 18 of the handles 17 of each tray, except the topmost one, serve as supports for the tray immediately above it, while the handles of the topmost tray support another wire screen container 10 which may be placed on top of the same.

After the fish have been through the scale removing process and after the removal of the heads and entrails they are flaked on the trays as described and subjected to the brine, the drying process and the oil process while they are in this flaked condition on the trays. They are only handled again manually when removed from the trays and packed in the tin cans.

It is obvious that the fish are evenly and quickly processed and the danger of their being broken up is reduced to a minimum.

I claim:

1. An apparatus for treating fish comprising, a foraminous basket rectangular in plan with a flat bottom and straight sides, and a plurality of flat foraminous trays removably stacked one upon the other in the basket and having means for spacing the trays apart.

2. An apparatus for treating fish comprising, a foraminous basket rectangular in plan with a flat bottom and straight sides, and a plurality of foraminous trays removably stacked in the basket, each of said trays comprising a flat wire screen having rolled side edges, a wire in each of said rolled side edges and U-shaped plates secured to the ends of the trays and handles extending upwardly from the U-shaped plates, said handles serving to space the trays apart when the trays are stacked one upon the other in the basket.

3. A fish tray comprising, a foraminous basket rectangular in plan with a flat bottom and straight sides, and a plurality of foraminous tray members removably stacked one upon the other in the basket and having handles serving to space the tray members apart.

4. A tray member comprising, a flat wire screen having rolled side edges, wires in each of said rolled side edges, U-shaped binding plates secured to the ends of the tray between the ends of the wires, and handles secured to the U-shaped plates and extending upwardly, so that the handles of one tray member will support the next tray member and hold the tray members spaced apart.

In testimony whereof I have signed my name to this specification.

RAYMOND B. BENTLEY.

Copies of this patent may be obtained for five cents each, by addressing the "Commissioner of Patents, Washington, D. C."